US008532006B2

(12) United States Patent
Henttonen et al.

(10) Patent No.: US 8,532,006 B2
(45) Date of Patent: Sep. 10, 2013

(54) DISCONTINUOUS RECEPTION WITH USER EQUIPMENT BASED MOBILITY

(75) Inventors: Tero Henttonen, Espoo (FI); Jussi K. Ojala, Helsinki (FI); Juho Pirskanen, Tampere (FI)

(73) Assignee: Renesas Mobile Corporation, Tokyo (JP)

( * ) Notice: Subject to any disclaimer, the term of this patent is extended or adjusted under 35 U.S.C. 154(b) by 362 days.

(21) Appl. No.: 13/071,742

(22) Filed: Mar. 25, 2011

(65) Prior Publication Data
US 2012/0243417 A1  Sep. 27, 2012

(51) Int. Cl.
*G08C 17/00* (2006.01)

(52) U.S. Cl.
USPC ......................................................... 370/311

(58) Field of Classification Search
None
See application file for complete search history.

(56) References Cited

U.S. PATENT DOCUMENTS

| | | | | |
|---|---|---|---|---|
| 7,076,248 | B2 * | 7/2006 | Amirijoo et al. | 455/432.1 |
| 2007/0291728 | A1 | 12/2007 | Dalsgaard et al. | |
| 2008/0108346 | A1 | 5/2008 | Umatt et al. | 455/432.1 |
| 2009/0180447 | A1 * | 7/2009 | Kim et al. | 370/338 |
| 2010/0048209 | A1 * | 2/2010 | Aoyama et al. | 455/435.2 |
| 2010/0184458 | A1 * | 7/2010 | Fodor et al. | 455/522 |
| 2011/0045833 | A1 * | 2/2011 | Kazmi | 455/436 |
| 2011/0269462 | A1 * | 11/2011 | Sagfors et al. | 455/436 |
| 2012/0207070 | A1 * | 8/2012 | Xu et al. | 370/311 |
| 2012/0250599 | A1 * | 10/2012 | Henttonen et al. | 370/311 |

FOREIGN PATENT DOCUMENTS

| | | |
|---|---|---|
| EP | 1 915 010 A2 | 4/2008 |
| EP | 2 056 541 A1 | 5/2009 |
| EP | 2 159 972 A1 | 3/2010 |
| EP | 2 214 442 A1 | 8/2010 |
| WO | WO 2005/006829 A2 | 1/2005 |
| WO | WO 2008/143563 A1 | 11/2008 |
| WO | WO 2009/097506 A1 | 8/2009 |

OTHER PUBLICATIONS

3GPP TS 36.413 V10.0.1 (Jan. 2011), 3$^{rd}$ Generation Partnership Project; Technical Specification Group Radio Access Network; Evolved Universal Terrestrial Radio Access Network (E-UTRAN); S1 Application Protocol (S1AP), (Release 10), (250 pages).

(Continued)

*Primary Examiner* — Anh-Vu Ly
(74) *Attorney, Agent, or Firm* — Stranton IP Law

(57) ABSTRACT

A new RRC Connected (mobility) state is described in which a UE utilizes a temporary identifier to monitor a downlink control channel in accordance with a discontinuous reception cycle; and maintains the new connected state, the discontinuous reception cycle and the temporary identifier while the UE re-selects to a second/serving access node which lies within a same designated reselection area as a first/source access node. In various specific embodiments, the DRX cycle is maintained but re-aligned with a system frame number of the second access node; the temporary identifier is a CRNTI and the designated re-selection area is defined by all contiguous cells in which respective access nodes broadcast the CRNTI in system information; the UE re-selects to the second access node in the absence of control signaling; and the UE enters the new connected mobility state automatically upon expiry of a time alignment timer or upon explicit network signaling while in a different connected state.

13 Claims, 7 Drawing Sheets

(56) References Cited

OTHER PUBLICATIONS

3GPP TS 36.212 V10.0.0 (Dec. 2010), 3$^{rd}$ Generation Partnership Project; Technical Specification Group Radio Access Network; Evolved Universal Terrestrial Radio Access (E-UTRA); Multiplexing and Channel Coding; (Release 10), (72 pages).

3GPP TS 36.213 V10.0.1 (Dec. 2010), 3$^{rd}$ Generation Partnership Project; Technical Specification Group Radio Access Network; Evolved Universal Terrestrial Radio Access (E-UTRA); Physical layer procedures (Release 10), (98 pages).

3GPP TS 36.321 V10.0.0 (Dec. 2010), Information About the Difference Betwechnical Specification Technical Specification Group Radio Access Network; Evolved Universal Terrestrial Radio Access (E-UTRA); Medium Access Control (MAC) Protocol Specification (Release 10), (53 pages).

3GPP TS 36.423 V10.0.0 (Dec. 2010), 3$^{rd}$ Generation Partnership Project; Technical Specification Group Radio Access Network; Evolved Universal Terrestrial Radio Access Network (E-UTRAN); X2 Application Protocol (X2AP), (Release 10), (123 pages).

3GPP RS 36.300 V10.0.0 (Jun. 2010), 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN; Overall Description; Stage 2 (Release 10), (183 pages).

3GPP TSG-RAN WG2 Meeting #56bis, R2-070043, Sorrento, Italy, Jan. 15-19, 2007, Ericsson, "Handover Procedure for DRX Operation in LTE_ACTIVE", (4 pages).

TSG-RAN Working Group 2 (Radio Layer 2 and Radio Layer 3), TSGR2#6(99)807, Sophia, Antipolis, Aug. 16-20, 1999, Ericsson, "RRC Protocol States", (14 pages).

* cited by examiner

DISCONTINUOUS RECEPTION WITH USER EQUIPMENT BASED MOBILITY

TECHNICAL FIELD

The exemplary and non-limiting embodiments of this invention relate generally to wireless communication systems, methods, devices and computer programs, and more specifically relate to connected states for a user equipment to more effectively manage power consumption at the user equipment.

BACKGROUND

The following abbreviations that may be found in the specification and/or the drawing figures are defined as follows:

3GPP third generation partnership project
CN core network
CRNTI cell radio network temporary identifier
DL downlink
DRX discontinuous reception
eNB node B/base station in an E-UTRAN system
EPC evolved packet core (CN of an LTE network)
E-UTRAN evolved UTRAN (LTE)
HARQ hybrid automatic repeat request
HSPA high speed packet access
ID identifier
LTE long term evolution
MAC medium access control
ms milli-seconds
PCH paging channel
PDCCH physical downlink control channel
PDSCH physical downlink shared channel
PRACH primary RACH
QoS quality of service
RACH random access channel
RLC radio link control
RNTI radio network temporary identifier
RRC radio resource control
SI system information
SRS sounding reference signals
TA timing advance
UE user equipment
UL uplink
URA UTRAN registration area
UTRAN universal terrestrial radio access network Various different wireless technologies specify procedures which are primarily directed toward managing power consumption in user devices which have a limited (galvanic) power supply. The LTE system utilizes a DRX period which allows the UE to depower certain hardware for certain (predefined) periods of time and receive possible DL and/or UL radio resource allocations on which DL and/or UL data is sent to the UE only in the time between those DRX periods where UE has not depowered its hardware. While in the conventional RRC connected mode and the UE is mobile and moving among cells of the network, typically the UE will be exchanging data fairly frequently but the volume of data is low (for example, data exchange of a few to a few hundred kilobytes every 5-30 seconds). For a typical network subscriber there is relatively higher activity in the morning prior to the subscriber beginning his/her commute (for example, email, web-surfing, voice calls) and thereafter the data activity is reduced during the commute even though some of those same host applications might remain active (for example, news/social network updates, keep alive or status reports, and push emails). Similar peaks and valleys of user activity are common for other times of the day and similarly it is common that various services remain open on the user device during the inactive periods in which there might be some automatic data transfer for application level updates.

Cellular networks provide different RRC states: LTE utilizes an RRC Connected state for data transmission and a RRC Idle state for inactive standby operations in the network. In RRC Idle, no data transmission or related signaling occurs between the UE and the network and so when there is some automated data transfer for application level updates as above, the UE is kept in or moved to the RRC Connected state. Transitioning from RRC Idle to RRC Connected requires signaling between the UE and the access network as well as between the UE and the Core Network. The purpose of such signaling is for authentication, security, and QoS authorization functions before the actual service data can be exchanged between the UE and the network.

The DRX in LTE is operative at certain times while the UE is in the RRC connected state, similar activity levels as in the RRC Idle state. That is, for LTE the UE's reception frequency can be the same in the RRC Connected mode as in the Idle mode for receiving UE paging. However, UE mobility (i.e. cell change) in the LTE RRC Connected mode is always handled by network-controlled handovers whereas in the LTE Idle mode the UE utilizes cell reselection, i.e. UE-controlled mobility.

Different wireless technologies utilize similar modes. For example, the UTRAN (HSPA) system has the additional RRC Connected states of CELL_PCH state and URA_PCH state. In those states the active data transmission is not possible but the RRC connection is maintained between the UE and the UTRAN, which reduces the signaling between the UE and the UTRAN and avoids the signaling between the UE and the CN completely as it relates to transitions from the RRC Idle to the RRC Connected states. The RRC connection is maintained between the UE and the serving RNC without having the UE context in the Node B, and state transitions are controlled by the serving RNC by using UE-dedicated RRC signaling. The UE's mobility in these states is handled by the UE-initiated cell reselection, where the UE location is updated in the serving RNC by cell and URA updates from the UE. The cell update is used in the CELL_PCH state and is performed at every cell reselection, while the URA update is used in the URA_PCH state and is performed at every UTRAN registration change.

During development of LTE Release 8, the target for the DRX in the RRC Connected mode was to design the DRX in such way that the UE power consumption would be at the same level as the LTE Idle mode. From the DRX cycle point of view this can be realized when a "long DRX cycle" and the "on duration" (the latter being the scheduled time in which the UE is awake and reading the PDCCH to see if it is scheduled) can have same value as used in the RRC idle mode, and the "inactivity timer" can be set to a very short value. An example long DRX setting in LTE could be: DRX cycle=640 ms; on duration=10 ms; inactivity timer=5 ms, which is quite comparable for the LTE Idle mode setting of DRX cycle=640 ms and on duration=5 ms. This kind of DRX setting would reduce the activity time to $\frac{1}{64}$, (1.56%), for receiving the possible downlink data transmission to the UE. In theory the DRX enables the UE to remain in a power saving mode for most of the time.

In practice the power savings are much less pronounced, as the LTE RRC Connected mode is limited by several factors. First, the UE still needs to perform handover measurements for detecting and measuring any new neighboring cells. It is recognized that these are co-located in time with downlink data reception as much as possible in the UE reception scheduler, and the measurement requirements are affected by the configured DRX periods so as to not overly disrupt the DRX operation. Second, the UE needs to send measurement reports to the network when any of several reporting criteria is triggered. As the LTE uplink utilizes HARQ and the measurement reports are sent in the RLC Acknowledge mode, the transmission of any measurement report interrupts the DRX and the UE then moves to the constant reception mode until the inactivity timer enables DRX operation once again. Third, at every cell change there will be a normal network-controlled handover based on the E-UTRAN handover decision. And fourth, the UE must always maintain the timing advance by having uplink transmission access and reception of a new TA value. A typical network may update its TA with a MAC TA command quite often, for example once every 160 ms or so. The TA update requires the UE to interrupt its DRX cycle and move to the constant reception mode.

Considering the typical user experience in the morning commute as noted above and the generally small size of cellular cells in urban areas through which most commuters move, the automatic data updates in passively open application level programs tend to keep the UE from realizing the power savings potential which the DRX intended. Every time the user moves toward a different cell the DRX will be interrupted for neighbor measurement reports and cell changes and additionally there may be further DRX interruptions for any new TA within or among cells. It is common for urban commuters to transmit multiple cells.

The inventors consider that forcing the UE to the RRC Idle mode during the morning commute or other periods of relative inactive data exchange is an incomplete solution for two reasons. First, the UE would still need to wake from its DRX to take and send neighbor measurement reports for handover purposes. Second, the UE would still need to receive the automatic data updates noted by example above, meaning a high signaling load (particularly in the LTE CN) for transitioning from the RRC Idle state to the RRC Connected state and establishing an S1 interface connection whenever this automated data is to be sent to or from the UE. What is needed in the art is a way to more fully realize at the UE the power savings which the DRX concept was meant to enable but which in practice often does not.

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: while a user equipment is in a connected state with a first access node, utilize a temporary identifier to monitor a downlink control channel in accordance with a discontinuous reception cycle of the user equipment; and maintain the connected state, the discontinuous reception cycle and the temporary identifier while the user equipment re-selects to a second access node which lies within a same designated reselection area as the first access node.

In a second exemplary embodiment of the invention there is a method comprising: while a user equipment is in a connected state with a first access node, utilizing a temporary identifier to monitor a downlink control channel in accordance with a discontinuous reception cycle of the user equipment; and maintaining the connected state, the discontinuous reception cycle and the temporary identifier while the user equipment re-selects to a second access node which lies within a same designated reselection area as the first access node.

In a third exemplary embodiment of the invention there is a computer readable memory storing a computer program, in which the computer program comprises: code for utilizing a temporary identifier to monitor a downlink control channel in accordance with a discontinuous reception cycle of a user equipment while the user equipment is in a connected state with a first access node; and code for maintaining the connected state, the discontinuous reception cycle and the temporary identifier while the user equipment re-selects to a second access node which lies within a same designated reselection area as the first access node.

In a fourth exemplary embodiment of the invention there is an apparatus comprising at least one processor and at least one memory storing a computer program. In this embodiment the at least one memory with the computer program is configured with the at least one processor to cause the apparatus to at least: utilize a first identifier of a user equipment and a second identifier of an access node, received from the user equipment in a random access procedure, to obtain from the access node a context for the user equipment; and transfer to the apparatus from the access node a radio resource control connection established according to the context.

In a fifth exemplary embodiment of the invention there is a method comprising: utilizing a first identifier of a user equipment and a second identifier of an access node, received from the user equipment in a random access procedure, to obtain from the access node a context for the user equipment; and transferring from the access node a radio resource control connection established according to the context.

In a sixth exemplary embodiment of the invention there is a computer readable memory storing a computer program, in which the computer program comprises: code for utilizing a first identifier of a user equipment and a second identifier of an access node, received from the user equipment in a random access procedure, to obtain from the access node a context for the user equipment; and code for transferring from the access node a radio resource control connection established according to the context.

These and other embodiments and aspects are detailed below with particularity.

DETAILED DESCRIPTION

In order to more fully realize the UE power savings potential of the DRX cycle in LTE, and similar discontinuous reception/transmission cycles of other wireless technologies, the exemplary embodiments below detail a new RRC connected mode termed a RRC Connected Mobility state (or mode). The name itself is not limiting and may be termed otherwise if adopted into a wireless standard; the advantages lie in the functionality and thus a functionally similar state or mode named differently will still fall within the teachings detailed further below. While the examples are in the context of the LTE system, this alone is not limiting but provided for a more thorough and practical description of this new RRC connected state.

In this new RRC connected state the UE can utilize a long DRX and does not need to perform HO measurement reporting and handover during the mobility between cells. It is characterized in that the UE can move within an area inside which UE mobility is handled by cell reselection but the UE remains in the RRC_CONNECTED state (the new state). Within this area, the UE monitors the serving cell PDCCH (based on its DRX cycle as in LTE Release 8) for the CRNTI it has been told to monitor. Monitoring the PDCCH using a CRNTI which has been dedicated for the UE is normal operation for conventional LTE, but in the embodiments below the CRNTI for the new RRC Connected Mobility state is not necessarily unique for one UE; several UEs in this same state at the same time will be utilizing the same CRNTI, which is reserved for this new state. To enhance backward compatibility, in an exemplary embodiment the size of this reserved CRNTI is the same as in LTE Release 8.

The network provides to the UE a network where the UE can move freely by cell reselection without any signaling towards the network, but the UE still keeps the RRC connection and its security context as in the conventional LTE RRC Connected state. In various exemplary embodiments the network can provide this information about the area via RRC signaling or it may provide this area information implicitly. By example, for the LTE embodiment this area is herein termed an "E-UTRAN reselection area", but more generally this area may be termed a designated reselection area since the extent of this area is pre-determined. In an embodiment detailed below with respect to FIG. 3, the network may also provide the UE with a "context ID" at this stage, to be used later when the UE again begins to send data. This context ID is used by the network to uniquely identify the particular UE. As detailed below, the context id is not necessary in all embodiments.

Figure 1:
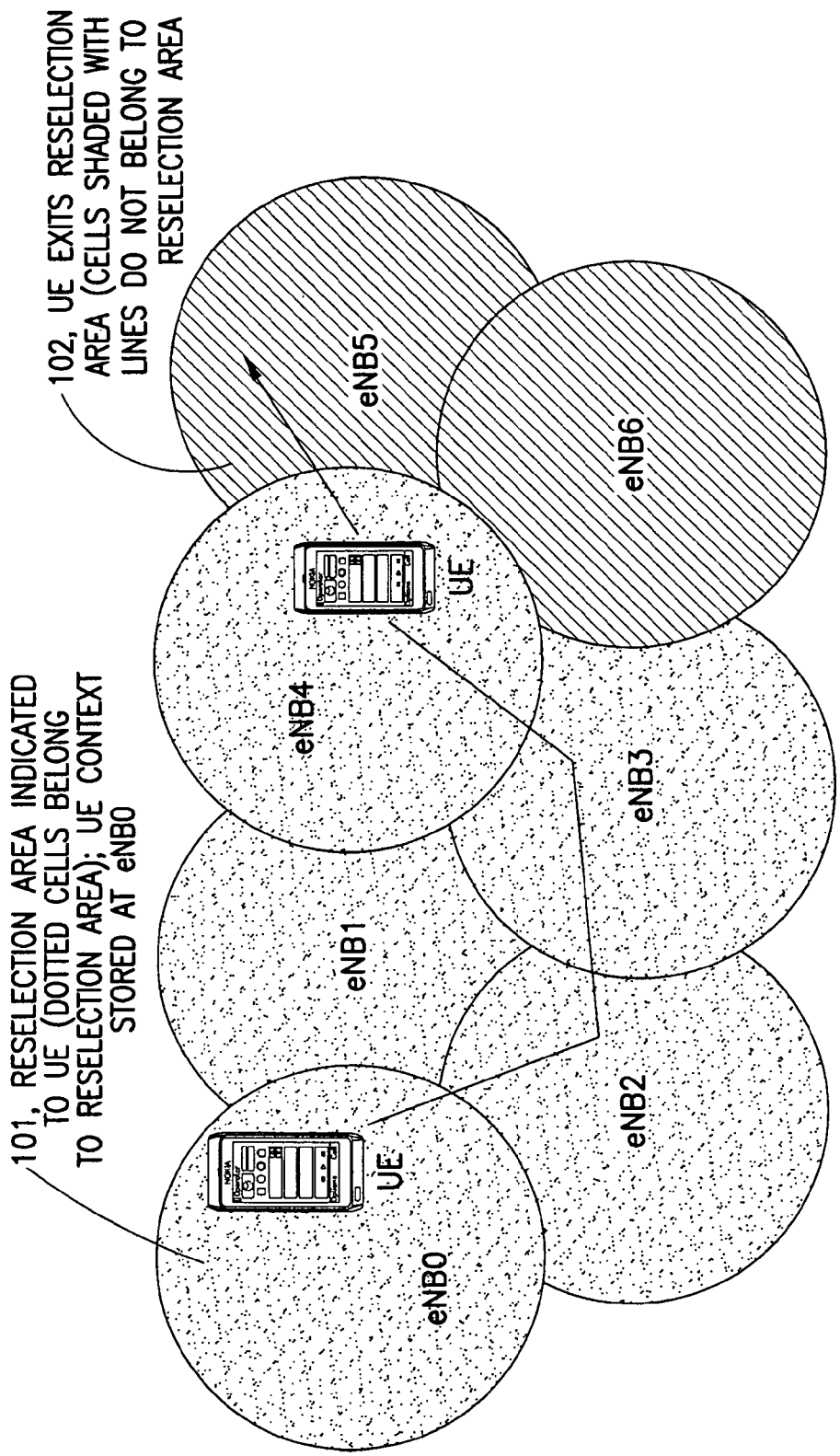
FIG. 1 is a schematic diagram illustrating a user equipment moving among a reselection area which defines limits for a RRC Connected Mobility state according to an exemplary embodiment of the invention.

FIG. 1 gives an overview of such an E-UTRAN reselection area, indicated there (and in FIGS. 2-3 also) by dotted shading in the cells. Lined shading indicates other cells which are not a part of the E-UTRAN reselection area. Assume the UE first enters the RRC Connected Mobility state while in the cell of eNB0, and thereafter travels through the cells of eNB2, eNB3, eNB4 and eNB5 as illustrated at FIG. 1. In this state the eNB0 gives to the UE at block 101 an RRC connection (and thereby RRC connection parameters such as RACH configuration, PDSCH/PUSCH configuration, CQI reporting configuration, measurement configuration and MAC configuration), which contains a DRX cycle which the UE utilizes to know when to monitor the PDCCH to see if it's scheduled and when it may enter a power save state, and a semi-permanent identifier such as a CRNTI which is reserved within the whole E-UTRAN reselection area for the RRC Connected Mobility state purpose. The originating eNB0 stores the UE context for later use as will be described with respect to FIG. 2.

By FIG. 1, the UE maintains that RRC connection, DRX cycle and CRNTI while re-selecting among eNB0, eNB2, eNB3 and eNB4 since through those cells the UE maintains the RRC Connected Mobility state. The UE terminates that RRC Connected Mobility state once it re-selects outside the E-UTRAN reselection area, which by FIG. 1 is when the UE moves to the cell of eNB5 at block 102. While in the RRC Connected Mobility state the UE keeps the RRC connection parameters between the reselections, but for example the exact start of the DRX cycle may change in the different cells since the DRX cycle is run according to the SFN of the serving cell. So the UE will maintain the same DRX cycle and DRX parameters throughout the entire time it remains in the RRC Connected Mobility state but may re-align the DRX cycle as it reselects to different cells within the designated reselection area, without changing the length of the active PDCCH monitoring intervals which the DRX cycle dictates.

The semi-permanent ID (e.g. the reserved CRNTI value) which eNB0 provided to the UE is used by the network in the PDCCH to indicate scheduling assignments to the UE in the RRC Connected Mobility state. In one embodiment the reselection area is defined as that set of cells, all contiguous to one another, which are broadcasting this semi-permanent ID in the E-UTRAN network. In an alternative embodiment the reselection area is defined as radius from the previous location where the reselection operation was started, from eNB0 in the FIG. 1 illustration.

In conventional LTE the UE already has automatic rules, such as expiration of Time alignment timer which triggers the UE to move to a state other than the conventional RRC Connected state. In an embodiment of these teachings such automatic rules are used to trigger the UE to move to this new RRC Connected Mobility state in which the UE controls its mobility from the conventional LTE RRC Connected mode with DRX in which the mobility is handled by network-directed handovers. While the UE is operating in the RRC Connected Mobility state using this reselection mobility, the UE does not need to maintain any valid uplink Timing Advance, but instead when the TA expires in this new state also the PUCCH and SRS resources expire.

In another embodiment, which may be in addition to or in place of the automatic (implicit) UE entry into the RRC Connected Mobility state, the network has the ability to explicitly signal the UE to enter this RRC Connected Mobility state. By example, this may be implemented by the network signaling to the UE to stop transmitting and go to this new state or by the UE signaling to the network that it is entering the RRC Connection Mobility state. Note that in certain cases such explicit signaling may interrupt the DRX.

Figure 2:
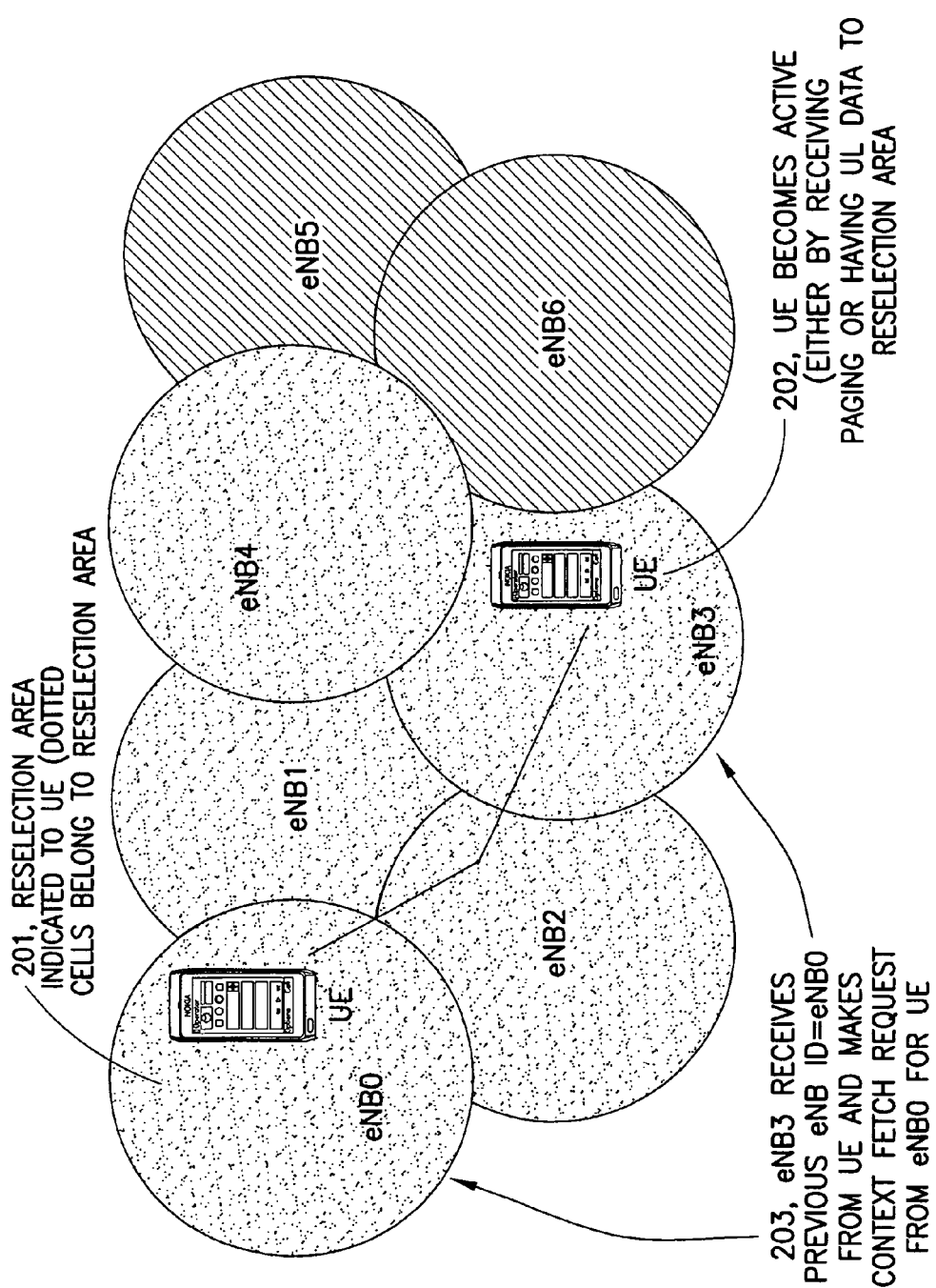
FIG. 2 is a schematic diagram similar to FIG. 1 but where the user equipment becomes active such as by utilizing the procedures detailed at FIG. 4 while still within the reselection area according to an exemplary embodiment of the invention.

FIG. 2 illustrates a scenario in which the UE in the RRC Connected state becomes active, such as for example if the UE has data it wishes to send UL or if the UE receives a page and needs to acquire a DL channel to receive data related to the page. Like FIG. 1, the UE first enters the RRC Connected Mobility state at block 201 when in the cell of eNB0, and thereafter moves to the cell of eNB3 after passing through eNB2, reselecting all the way while maintaining the same DRX and semi-permanent ID (the reserved CRNTI in the above example). While within the cell of eNB3 the UE becomes active as noted above, shown by block 202. In this case the UE in the RRC Connected Mobility state performs a contention-based RACH procedure. In general this may be considered similar to the LTE Release 8 UE performing a RACH procedure when the UE no longer has a valid TA, but in this case the procedure is modified so that the UE not only obtains the valid TA but also the contents of the UE's RACH message (message 3) are changed as detailed at FIG. 4. During this RACH procedure, the UE sends to eNB3 the ID of the cell in which the UE first entered the RRC Connected Mobility state and which gave the UE its RRC connection parameters, DRX cycle parameters and the reserved CRNTI. At block 203 this ID is that of eNB0, which eNB3 uses to know from where to fetch the UE context which eNB0 stored for the UE in FIG. 1.

Since in the above description the UE of FIGS. 1 and 2 is given the CRNTI that is reserved in the reselection area for the RRC Connected Mobility state, it is possible that multiple UEs in the same reselection area and which are all in the same RRC Connected mobility state might attempt access on the RACH at the same time. Since both UEs will be utilizing the same reserved CRNTI in this case, FIG. 4 below details a modification to the RACH procedure which enables the network to unambiguously identify the correct UE for fetching the UE context from another eNB within the designated reselection area.

Rather than the reserved CRNTI which as noted above might be allocated to multiple UEs, in an embodiment the UE may be given a unique semi-permanent identifier for use in the RRC Connected Mobility state. This would require a bit more coordination among the various eNBs that lie within the designated reselection area to assure the unique ID assignments to potentially several UE's are unambiguously unique, since different eNBs within the designated reselection area can allocate these IDs which are to remain unique throughout the whole area. But the inventors consider that this more extensive coordination among the eNBs is less desirable, and instead a more preferred embodiment is to utilize a reserved ID which might possibly be allocated to multiple UEs within the same designated reselection area. The reason the reserved ID which may not be UE-unique is preferable is that collisions on the RACH access can mostly be avoided by having reselection areas that are orthogonal (to avoid collisions from UEs in adjacent reselection areas). But even if not orthogonal, and/or for the case of UEs within the same reselection area, then the probability of a collision is considered to be fairly rare. At least in the majority of possible collision instances this rare collision potential may still be solved within the RACH process itself as detailed below.

Figure 3:
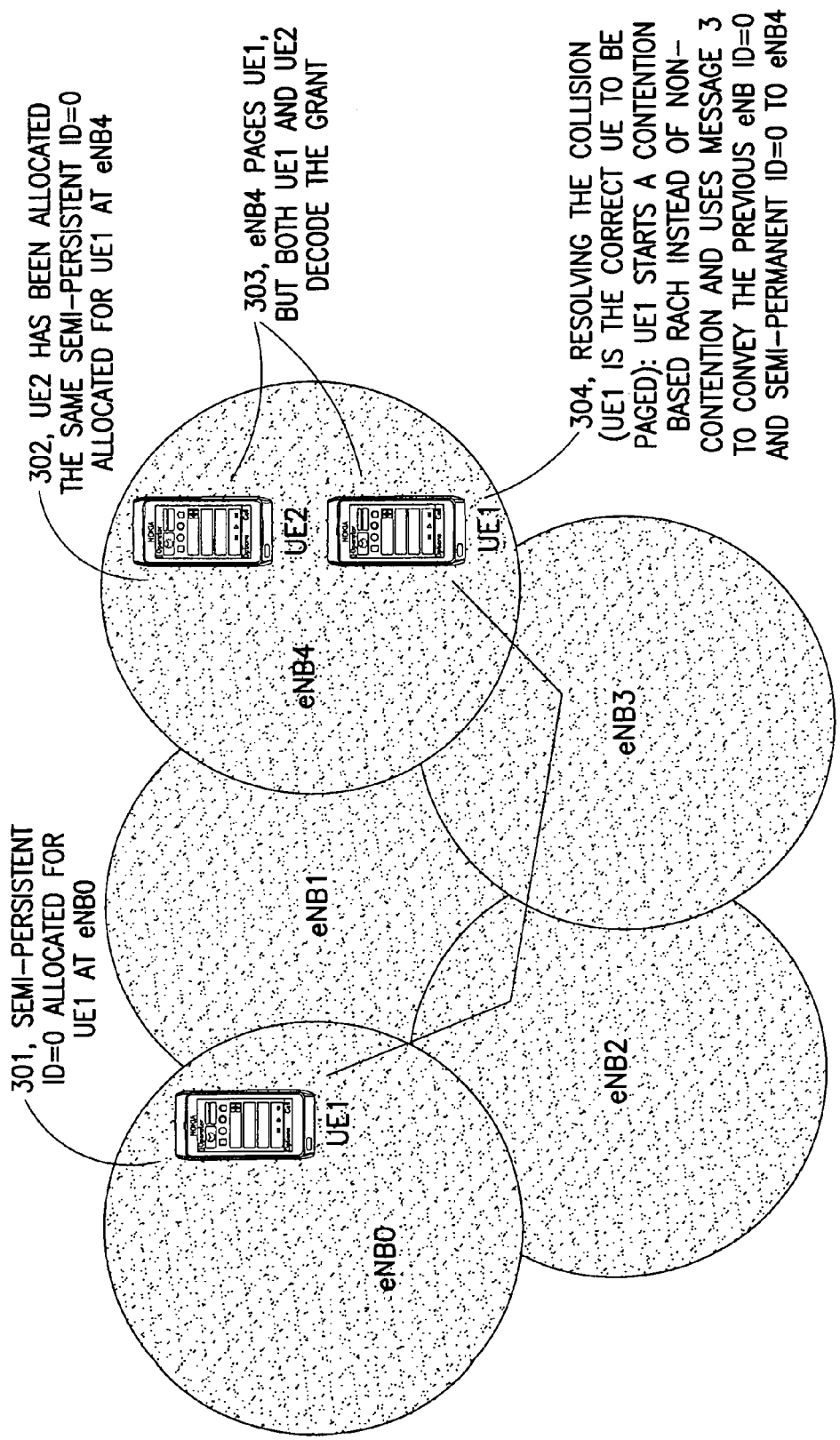
FIG. 3 is similar to FIG. 3 but illustrating resolution for a potential collision of two user equipments both becoming active at the same time according to an exemplary embodiment of the invention.

FIG. 3 illustrates the case in which two UEs in the same designated reselection area have the same RNTI and access the RACH at the same time. UE1 is in the RRC Connected Mobility state and received the reserved CRNTI from its source eNB0, while UE2 is in a conventional RRC Connected state and received its CRNTI from serving cell eNB4. At block 301 UE1 entered the RRC Connected Mobility state in the cell of eNB0 where it was allocated CRNTI=0 (as well as the RRC connection parameters and the DRX parameters). UE1 then reselected to eNB4 via eNB2 and eNB3. UE2 is in the conventional RRC Connected state while in the cell of eNB4 at block 302 and by chance is also allocated CRNTI=0 since in certain embodiments if the reserved CRNTI is not broadcast in SI by all cells in the designated reselection area there is no coordination of CRNTI among them.

UE1 receives a PDCCH from eNB4 at block 303 which is addressed to CRNTI=0, or alternatively it might be that UE1 receives a page on the PCH addressed to CRNTI=0. If one assumes an extraordinary case in which UE2 has not only the same CRNTI but also a same or overlapping DRX on-interval as UE1 (or paging window), then UE2 will also decode the PDCCH (or page) addressed to CRNTI=0. Neither UE1 nor UE2 can know from only the PDCCH/page for CRNTI=0 that it is intended only for UE1. UE2 follows the conventional procedures for the RRC Connected state and tunes to the PDSCH indicated by the PDCCH. Since it is UE1 in the RRC Connected Mobility state that is being paged, UE2 will find no data for itself on the PDSCH, assume it decoded the PDCCH in error, and return to its normal DRX cycle in the conventional RRC Connected state and go to sleep.

UE1 in the RRC Connected Mobility state responds to the PDCCH or page addressed to CRNTI=0 by initiating a RACH procedure which block 304 explains resolves the conflict. Specifically, at block 304 UE1 sends the ID of the eNB in which UE1 first entered the RRC Connected Mobility state and also the semi-permanent ID (the reserved CRNTI) allocated to it by the source eNB0. In the FIG. 3 example, UE1 will report the ID for eNB0 and the reserved CRNTI value during its RACH procedure, and UE2 will not be accessing the RACH procedure at all. It is from the RACH procedure that UE1 in the RRC Connected Mobility state gets an updated TA, but UE2 in the conventional RRC Connected state has valid TA and so will not undertake a RACH procedure.

Figure 4:
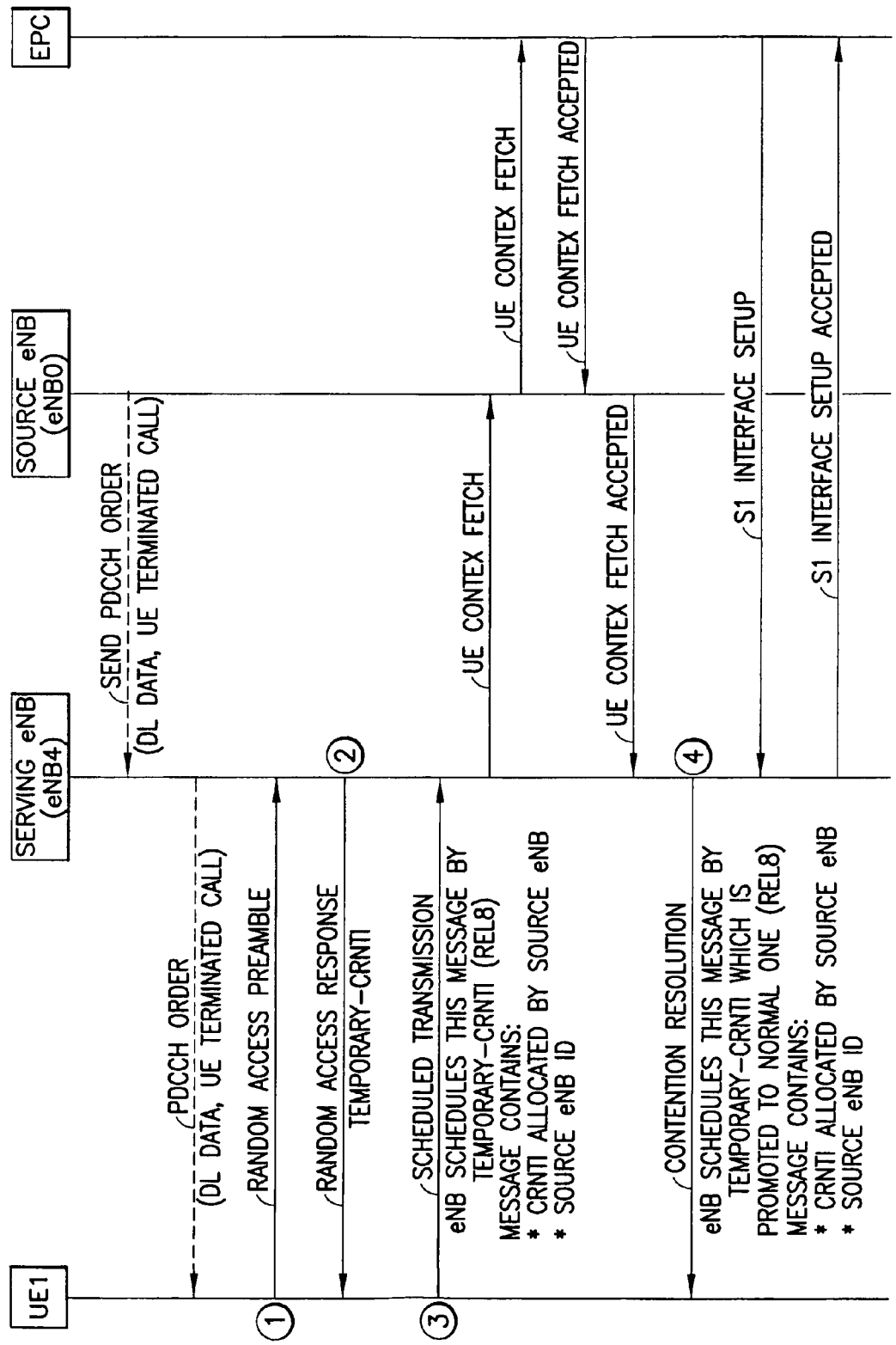
FIG. 4 is a signaling diagram illustrating a contention based random access procedure by which a user equipment becomes active while in the RRC Connected Mobility state according to an exemplary embodiment of the invention.

FIG. 4 is a signaling diagram illustrating an exemplary but non-limiting modified RACH procedure which UE 1 of FIG. 3 initiates when it goes active while in the RRC Connected Mobility state. As noted at block 202 of FIG. 2, the UE may go active when it has data to send UL, or in response to receiving a PDCCH or page directed the semi-permanent ID (the reserved CRNTI value). The UE, serving eNB and source eNB in FIG. 4 correspond to the respective UE1, eNB0 and eNB4 of FIG. 3. Assume there is incoming DL data for UE1, or an incoming call. UE1 was last registered to the wireless network at the source eNB0, so the CN sends the DL data/incoming call to eNB0 which sends it onward to the serving eNB4. As detailed for FIG. 3, UE1 decodes the PDCCH, sees there is an allocation of radio resources for CRNTI=0 which is assigned (by eNB0) to UE1, and since UE1 is in the RRC Connected Mobility state it initiates a RACH procedure, modified as below, rather than going to radio resources mapped from the PDCCH itself.

At message 1 the UE sends a RACH preamble in its contention period to the serving eNB4, utilizing backoff timers and re-transmissions of the preamble at incremented transmission power levels in case of collisions as is conventional for RACH procedures in LTE. Once the serving eNB4 receives that preamble it sends to the UE a conventional (unique) temporary CRNTI. At this point the UE1 has two CRNTIs, the temporary one it just received in message 2 of the RACH procedure, and the reserved CRNTI which it received from the source eNB0 for use while in the RRC Connected Mobility state. In an embodiment the UE1 automatically reverts back to the reserved CRNTI once the data exchange immediately following the RACH procedure is complete, so long as the UE 1 remains in the RRC Connected Mobility state. During the RACH procedure of FIG. 4 the UE1 also remains in this new RRC Connected Mobility state. The UE1 also knows two eNB IDs, that of the source eNB0, and that of its serving eNB4.

In this modified contention-based RACH procedure the UE will include both the previous/source eNB0 ID as well as the UE's own semi-permanent ID in message 3, which is the contention resolution message that the UE sends to its serving eNB4. From the fact that the ID for eNB0 is in message 3, the serving eNB4 knows that UE 1 is in the RRC Connected Mobility state and then uses the semi-permanent ID it received from the UE in message 2 to fetch the UE context from the source eNB0 which the serving eNB4 identifies from the received source eNB ID itself. The source eNB is the one at which the UE1 was last active. From message 3, the EPC can transfer the existing RRC connection and also the S1 interface from the source eNB0 where the UE1 was last active to the serving eNB4 where the UE is now active again.

In case there are multiple UEs within the designated reselection area which are each allocated the same CRNTI, then the value of the source eNB0 will be sufficient for the serving eNB4 to fetch the correct UE context. Consider the FIG. 3 example if both UE1 and UE2 were in the new RRC Connected Mobility state. If the two UEs have the same CRNTI then both would respond to the PDCCH or page at block 303 by initiating a RACH procedure such as is detailed by example at FIG. 4. In this case the network can uniquely identify UE1 from UE2 from the different source eNB IDs the UEs send in message 3 of FIG. 4. If instead these two UEs have the same source eNB IDs then they will not be allocated the same CRNTI since any individual source eNB will not re-use a CRNTI that is still in use by another UE. Therefore the combination of CRNTI and source eNB ID will always uniquely identify a UE in the new RRC Connected Mobility state within any given designated reselection area.

Though the collision probability that two UEs with the same CRNTI access the RACH at the same time is quite small, even this collision can be resolved completely for the case of a mobile-originated call setup on the RACH. In this case the UE1 is not responding to a PDCCH or page but initiating its own UL activity. Collision resolution in this case is solved by the temporary CRNTI which the serving eNB4 gives to the UE1 in message 2. UE1 includes this temporary CRNTI in its UL message 3, which the serving eNB4 echoes back to UE1 in message 4 which is the contention resolution message. So while UE1 retains its reserved CRNTI for later use when it reverts to being inactive in the RRC Connected Mobility state which it never leaves while undertaking the RACH procedure, during the RACH procedure UE1 will be addressed using this temporary CRNTI first given by the serving eNB4 in message 2 of FIG. 4. The serving eNB4 still uses the reserved CRNTI to fetch the UE context from the source eNB0, and as above knows to fetch from the fact that the source eNB0 ID is included in message 3. In the case of mobile terminated data transfer (or call setup), the UE1 is responding to a PDCCH or page and still a temporary CRNTI can be used for the RACH procedure while the semi-permanent CRNTI can be used for the context fetch.

Normally when two UEs begin a RACH procedure at the same time, collisions in the air interface are avoided (or at least repeat collisions are avoided) in conventional RACH procedures by each UE utilizing a pseudo-random back-off timer for its next RACH attempt to send its preamble at message 1. This collision avoidance is retained for the case of two UEs sending their preambles at the same time. Exemplary embodiments include a further collision avoidance mechanism to distinguish among two UEs with the same CRNTI. Assume as for FIG. 3 that both UE1 and UE2 are assigned CRNTI=0, UE1 is in the RRC Connected Mobility state and UE2 is in the conventional RRC Connected state. This additional collision avoidance mechanism utilizes a designated PRACH mask index to distinguish among those two UEs. This designated PRACH mask index is reserved for use for UEs in the new RRC Connected Mobility state, and preferably there is more than one such PRACH mask index reserved for this purpose in a given designated reselection area.

So for example if the designated PRACH mask index is used for UEs in the new RRC Connected Mobility state, then the serving eNB4 can use the designated PRACH mask index value to mask the CRNTI=0 in the PDCCH if the allocation is directed to UE1 in the new RRC Connected Mobility state, and not use the designated PRACH mask index value (e.g., will use some other PRACH index mask value) to mask the CRNTI=0 in the PDCCH if the PDCCH allocation is directed to UE2 in the conventional RRC Connected state. In the former case UE2 will be unable to decode the CRNTI=0 that has the designated mask and so will not waste its limited power supply acknowledging the grant and tuning to the mapped PDSCH. In the latter case UE1 knows the PDCCH with CRNTI=0 is not directed to UE1 since it was not masked with a designated PRACH mask value, or UE1 will simply not continue trying to decode once it tries all the designated PRACH masks and still fails to resolve the CNRTI in the PDCCH. In either case UE1 will not initiate a RACH procedure in response to a PDCCH intended for UE2.

The inventors have determined the probability of a collision from two UEs using the same CRNTI as about 1 in 65,000. To further resolve potential collisions, in addition the techniques detailed above the UE responding to the PDCCH with the RACH procedure can provide a "context ID" which it received from the source eNB0 with its CRNTI. The source eNB0 stores the UE context along with the context ID, and the serving eNB4 sends the context ID to the source eNB0 to unambiguously identify the UE1 in question in case the source eNB0 has context stored for two or more UEs using the same CRNTI in the designated reselection area.

In the case of mobile terminated data transfer (or call setup), the source eNB0 having the UE1 context (at which the RRC connection and S1 interface are terminated before the UE goes active with the serving eNB4) will in an embodiment distribute at least the following information to all eNBs which are within the E-UTRAN reselection area:

a) CRNTI allocated to the UE.
b) DRX pattern information configured to the UE.
c) Indication of DL data availability or other QoS, priority information.
d) Source eNB-ID indicating the eNB that has stored the UE context.

Exemplary embodiments of these teachings exhibit the technical effect of reducing UE power consumption as compared to normal DRX with network-controlled handover mobility but without increasing the signaling load towards the core network. Further technical effects of various embodiments include that the CRNTI can be used as the semi-permanent identifier for the UE, PDCCH formats can remain similar to the LTE Release 8 for backward compatibility since there is no need for a global UE ID for addressing the UE, the CRNTI allocation by a given eNB does not need to be coordinated with other eNBs in the network since collisions of CRNTI's are handled by the RACH procedure, and the modifications to the RACH access message contents are not major and so are easily implemented. It is not considered major impediments that the context fetch procedure would need to be supported by the network as a whole, nor that there is some modification to the conventional RACH procedure.

Figure 5A:
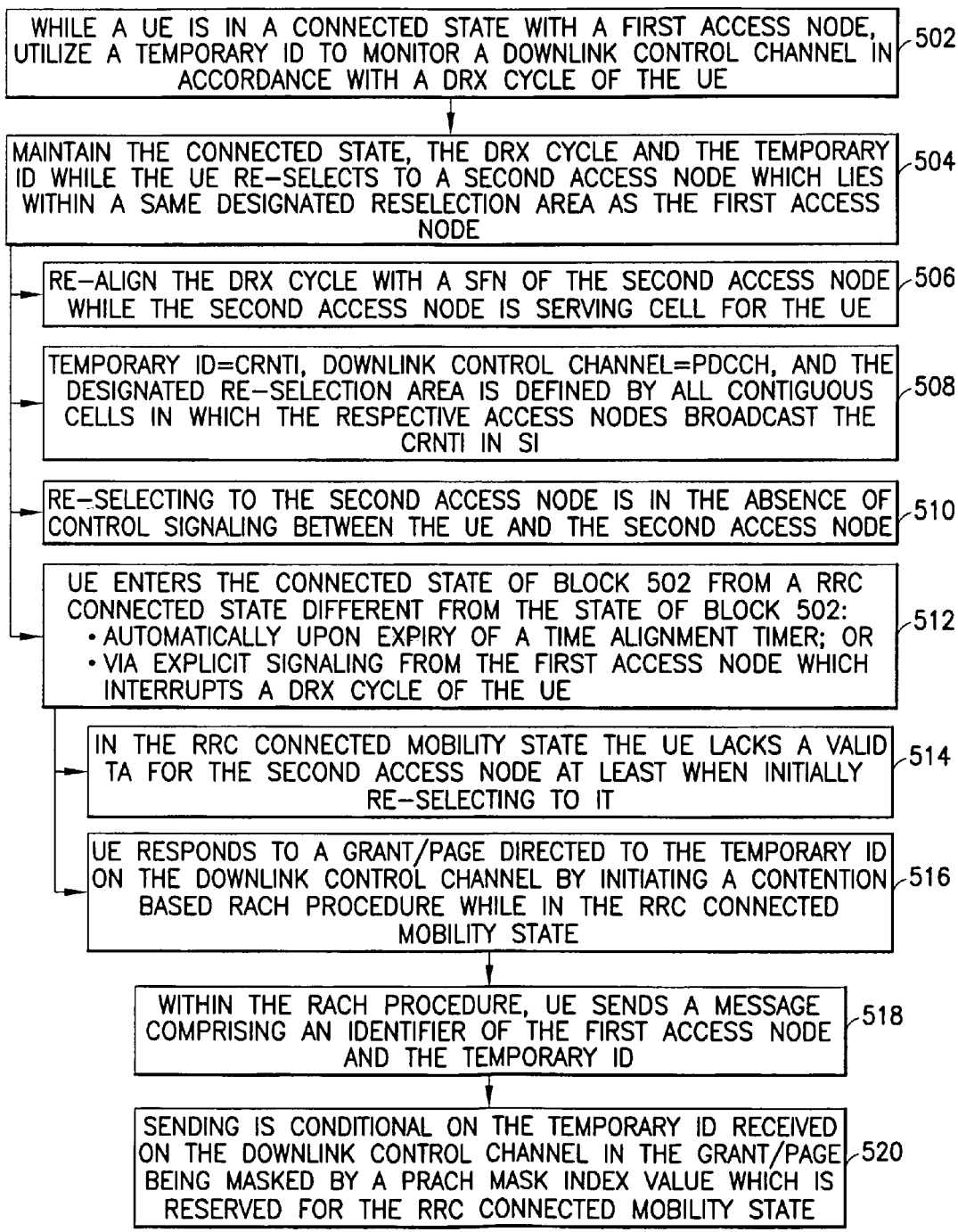
FIG. 5A is a logic flow diagram that illustrates from the perspective of a user equipment the operation of a method, and a result of execution of computer program instructions embodied on a computer readable memory, in accordance with the exemplary embodiments of this invention.
Figure 5B:
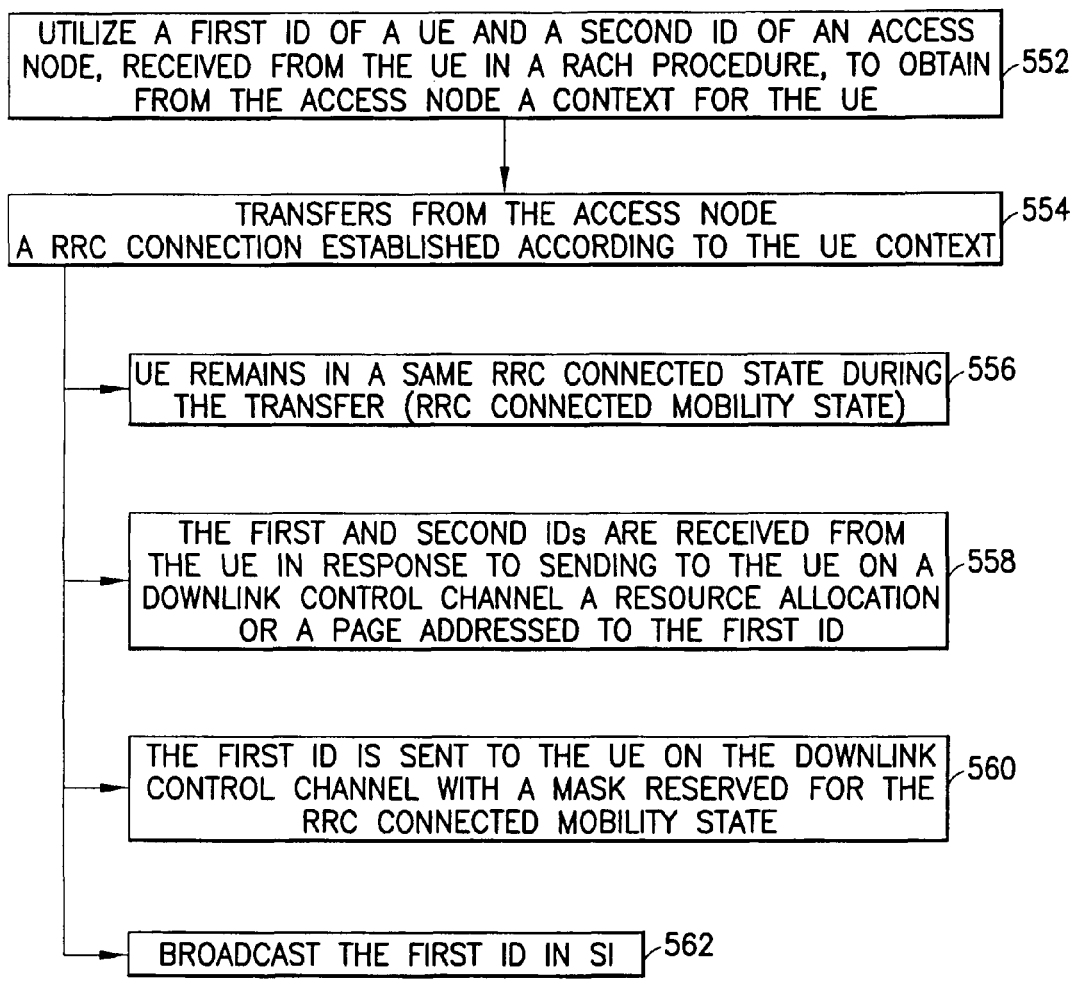
FIG. 5B is a logic flow diagram that illustrates from the perspective of a network access node the operation of a method, and a result of execution of computer program instructions embodied on a computer readable memory, in accordance with the exemplary embodiments of this invention.

FIGS. 5A-B are logic flow diagrams which describe exemplary embodiments of the invention in a manner which may be from the perspective of the UE for FIG. 5A, and the serving eNB for FIG. 5B. FIGS. 5A-B may each be considered to illustrate the operation of a method, and a result of execution of a computer program stored in a computer readable memory, and a specific manner in which components of an electronic device (e.g., a UE or one or more sub-systems thereof) are configured to cause that electronic device to operate. The various blocks shown in FIGS. 5A-B may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

First consider the UE perspective at FIG. 5A. At block 502, while a UE is in a connected state with a first access node (such as the new RRC Connected Mobility state with the source eNB0), the UE utilizes a temporary identifier to monitor a downlink control channel (such as a PDCCH or PCH) in accordance with a discontinuous reception cycle of the UE. The temporary identifier of block 502 is the semi-permanent UE ID, which in the above examples is the reserved CRNTI. At block 504 the UE or device maintains the connected state, the discontinuous reception cycle and the temporary identifier while the UE re-selects to a second access node (e.g., the serving eNB4) which lies within a same designated reselection area as the first access node.

The remainder of FIG. 5A illustrates more specific implementations for blocks 502 and 504. Block 506 provides further detail for block 504, maintaining the DRX cycle comprises re-aligning the DRX cycle with a SFN of the second access node while the second access node is serving cell for the UE.

Block 508 specifies that the temporary identifier is a CRNTI, the downlink control channel is a PDCCH on which the UE receives scheduling allocations associated with the CRNTI, and the designated re-selection area is defined by all contiguous cells in which the respective access nodes broadcast the CRNTI in SI.

Block 510 specifies the connected state of block 502 is a radio resource control connected mobility state, and that maintaining the RRC connected mobility state, the DRX cycle and the CRNTI while the UE re-selects as in block 504 is in the absence of control signaling between the UE and the second access node.

Block 512 details two embodiments, one in which the UE enters the RRC connected mobility state automatically upon expiry of a time alignment timer while in a RRC connected state different from the RRC connected mobility state, and the second in which the UE enters the RRC connected mobility state via explicit signaling from the first access node which interrupts a DRX cycle of the UE, also while the UE is in a RRC connected state different from the RRC connected mobility state.

Blocks 514 and 516 provide further detail for either option of block 512. At block 514 the RRC connected mobility state is characterized by the UE lacking a valid TA for the second access node at least when the UE initially re-selects to the second access node. At block 516 the UE/apparatus responds to either a grant of radio resources or a page, either of which is directed to the temporary identifier on the downlink control channel, by initiating a contention based RACH procedure while in the RRC connected mobility state.

Block 518 describes the message 3 modification detailed above; the UE sends, within the RACH procedure, a message comprising an identifier of the first access node and the temporary identifier. Block 520 describes that the UE's sending in block 518 is conditional on the temporary identifier, which is received on the downlink control channel in the grant or page, being masked by a PRACH mask index value which is reserved for the RRC connected mobility state.

Now consider the serving eNB perspective at FIG. 5B. At block 552 the eNB or component(s) thereof utilize a first identifier of a UE and a second identifier of an access node, received from the UE in a RACH procedure, to obtain from the access node a context for the UE. By example this first identifier is the reserved CRNTI of the above examples, and the second identifier is the ID for the source eNB0. Then at block 554 the eNB transfers to itself from the access node a RRC connection established according to the UE context.

The remainder of FIG. 5B illustrates more specific implementations for blocks 552 and 554. At block 556 the user equipment remains in the same RRC connected state during the transfer, which by example is the RRC Connected Mobility state of the above examples. At block 558 the first and the second identifiers are received from the user equipment in response to the serving eNB sending to the UE on a downlink control channel a resource allocation or a page addressed to the first identifier. Block 560 specifies that the first identifier sent to the user equipment on the downlink control channel is sent with a mask reserved for the RRC connected state which is the RRC connected mobility state. And at block 562 the serving eNB broadcasts the first identifier in SI. Note that the serving eNB is broadcasting this reserved CRNTI in SI even prior to receiving the first identifier/reserved CRNTI from the UE.

FIGS. 5A-B may be considered to reflect a modem which may be apart from or disposed in the UE or eNB of the above description and further detailed below.

Figure 6:
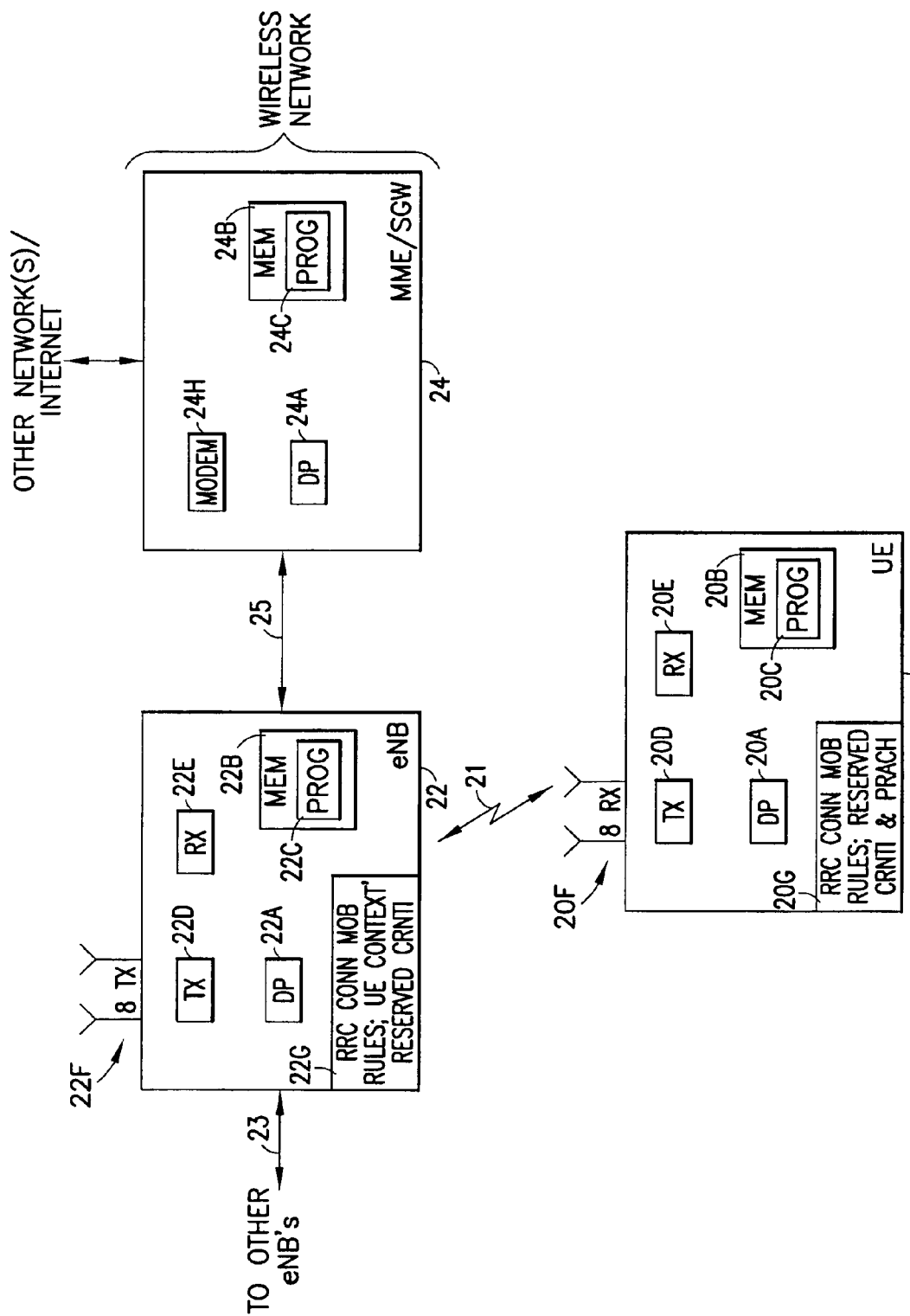
FIG. 6 is a simplified block diagram of the UE in communication with a wireless network illustrated as an eNB and a serving gateway SGW, which are exemplary electronic devices suitable for use in practicing the exemplary embodiments of this invention.

Reference is now made to FIG. 6 for illustrating a simplified block diagram of various electronic devices and apparatus that are suitable for use in practicing the exemplary embodiments of this invention. In FIG. 6 a wireless network (eNB 22 and mobility management entity MME/serving gateway SGW 24) is adapted for communication over a wireless link 21 with an apparatus, such as a mobile terminal or UE 20, via a network access node, such as a base or relay station or more specifically an eNB 22. The network may include a network control element MME/SGW 24, which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNB 22 via one or more antennas 20F (8 RX antennas shown but there may be as few as one RX antenna in certain embodiments). Also stored in the MEM 20B at block 20G is a set of rules for operating in the RRC Connected Mobility state as detailed above, and possibly also the reserved values of the CRNTI and PRACH mask for that same state.

The eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F (8 TX antennas shown as in the above examples though these teachings may be utilized with 4 or some other number of TX antennas). There is a data and/or control path 25 coupling the eNB 22 with the MME/SGW 24, and another data and/or control path 23 coupling the eNB 22 to other eNBs/access nodes. The eNB 22 also stores at block 22G a set of rules for operating in the RRC Connected Mobility state as detailed above, the reserved values of the CRNTI and PRACH mask for that same state, and the list of other eNBs which make up the designated reselection area.

Similarly, the MME/SGW 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the eNB 22 via the data/control path 25. While not particularly illustrated for the UE 20 or eNB 22, those devices are also assumed to include as part of their wireless communicating means a modem which may be inbuilt on an RF front end chip within those devices 20, 22 and which also carries the TX 20D/22D and the RX 20E/22E.

At least one of the PROGs 20C in the UE 20 is assumed to include program instructions that, when executed by the associated DP 20A, enable the device to operate in accordance with the exemplary embodiments of this invention, as detailed above. The eNB 22 may also have software stored in its MEM 22B to implement certain aspects of these teachings as detailed above. In these regards the exemplary embodiments of this invention may be implemented at least in part by computer software stored on the MEM 20B, 22B which is executable by the DP 20A of the UE 20 and/or by the DP 22A of the eNB 22, or by hardware, or by a combination of tangibly stored software and hardware (and tangibly stored firmware). Electronic devices implementing these aspects of the invention need not be the entire UE 20 or eNB 22, but exemplary embodiments may be implemented by one or more components of same such as the above described tangibly stored software, hardware, firmware and DP, a system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A and 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE Release 10 system, it should be appreciated that the exemplary embodiments of this invention are not limited for use with only this one particular type of wireless communication system, and that they may be used to advantage in other wireless communication systems such as for example UTRAN, GERAN and GSM and others.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
   at least one processor; and
   at least one memory storing a computer program;
   in which the at least one memory with the computer program is configured with the at least one processor to cause the apparatus to at least:
   while a user equipment is in a radio resource control connected mobility state with a first access node, utilize a temporary identifier to monitor a downlink control channel in accordance with a discontinuous reception cycle of the user equipment; and
   maintain the radio resource control connected mobility state, the discontinuous reception cycle and the temporary identifier while the user equipment re-selects, in the absence of control signaling between the user equipment and a second access node, to the second access node which lies within a same designated reselection area as the first access node,
   in which the user equipment enters the radio resource control connected mobility state automatically upon expiry of a time alignment timer while the user equipment is in a radio resource control connected state different from the radio resource control connected mobility state.

2. The apparatus according to claim 1, in which maintaining the discontinuous reception cycle comprises re-aligning the discontinuous reception cycle with a system frame number of the second access node while the second access node is serving cell for the user equipment.

3. The apparatus according to claim 1, in which the temporary identifier is a cell radio network temporary identifier and the downlink control channel is a physical downlink control channel on which the user equipment receives scheduling allocations associated with the cell radio network temporary identifier,
and the designated re-selection area is defined by all contiguous cells in which respective access nodes broadcast the cell radio network temporary identifier in system information.

4. The apparatus according to claim 1, in which the radio resource control connected mobility state is characterized by the user equipment lacking a valid timing advance for the second access node at least when the user equipment initially re-selects to the second access node.

5. The apparatus according to claim 1, in which the at least one memory with the computer program is configured with the at least one processor to cause the apparatus to at least further:
   respond to either a grant of radio resources or a page, directed to the temporary identifier on the downlink control channel, by initiating a contention based random access procedure while in the radio resource control connected mobility state.

6. The apparatus according to claim 5, wherein for the case in which the user equipment entered the radio resource control connected mobility state while the first access node was serving cell for the user equipment, the at least one memory with the computer program is configured with the at least one processor to cause the apparatus to send, within the random access procedure, a message comprising an identifier of the first access node and the temporary identifier.

7. The apparatus according to claim 6, wherein the at least one memory with the computer program is configured with the at least one processor to cause the apparatus to condition the apparatus' initiating of the contention based random access procedure on the temporary identifier, which is received on the downlink control channel in the grant or page, being masked by a primary random access channel mask index value which is reserved for the radio resource control connected mobility state.

8. A method comprising:
  while a user equipment is in a radio resource control connected mobility state with a first access node, utilizing a temporary identifier to monitor a downlink control channel in accordance with a discontinuous reception cycle of the user equipment; and
  maintaining the radio resource control connected mobility state, the discontinuous reception cycle and the temporary identifier while the user equipment re-selects, in the absence of control signaling between the user equipment and a second access node, to the second access node which lies within a same designated reselection area as the first access node,
in which the user equipment enters the radio resource control connected mobility state automatically upon expiry of a time alignment timer while the user equipment is in a radio resource control connected state different from the radio resource control connected mobility state.

9. The method according to claim 8, in which maintaining the discontinuous reception cycle comprises re-aligning the discontinuous reception cycle with a system frame number of the second access node while the second access node is serving cell for the user equipment, and the designated re-selection area is defined by all contiguous cells in which respective access nodes broadcast the temporary identifier in system information.

10. The method according to claim 8, in which the radio resource control connected mobility state is characterized by the user equipment lacking a valid timing advance for the second access node at least when the user equipment initially re-selects to the second access node.

11. The method according to claim 8, in which the method further comprises:
  responding to either a grant of radio resources or a page, directed to the temporary identifier on the downlink control channel, by initiating a contention based random access procedure while in the radio resource control connected mobility state.

12. A non-transitory computer readable memory storing a computer executable program comprising:
  code for utilizing a temporary identifier to monitor a downlink control channel in accordance with a discontinuous reception cycle of a user equipment while the user equipment is in a radio resource control connected mobility state with a first access node; and
  code for maintaining the connected state, the discontinuous reception cycle and the temporary identifier while the user equipment re-selects, in the absence of control signaling between the user equipment and a second access node, to the second access node which lies within a same designated reselection area as the first access node,
in which the user equipment enters the radio resource control connected mobility state automatically upon expiry of a time alignment timer while the user equipment is in a radio resource control connected state different from the radio resource control connected mobility state.

13. The non-transitory computer readable memory according to claim 12, in which the code for maintaining the discontinuous reception cycle comprises code for re-aligning the discontinuous reception cycle with a system frame number of the second access node while the second access node is serving cell for the user equipment, and the designated re-selection area is defined by all contiguous cells in which respective access nodes broadcast the temporary identifier in system information.

\* \* \* \* \*